(12) United States Patent
Akashi et al.

(10) Patent No.: US 12,510,368 B2
(45) Date of Patent: Dec. 30, 2025

(54) VISIBILITY SUPPORT SYSTEM, INDUSTRIAL VEHICLE, VISIBILITY SUPPORT METHOD, AND PROGRAM

(71) Applicant: Mitsubishi Logisnext Co., Ltd., Nagaokakyo (JP)

(72) Inventors: Takuya Akashi, Nagaokakyo (JP); Keisuke Tsukahara, Tokyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 105 days.

(21) Appl. No.: 18/532,711

(22) Filed: Dec. 7, 2023

(65) Prior Publication Data

US 2024/0210186 A1   Jun. 27, 2024

(30) Foreign Application Priority Data

Dec. 22, 2022   (JP) .................................. 2022-205736

(51) Int. Cl.
  *G01C 21/34*  (2006.01)
  *B66F 9/075*  (2006.01)
  *G01C 21/36*  (2006.01)

(52) U.S. Cl.
  CPC ........ G01C 21/3461 (2013.01); B66F 9/0755 (2013.01); G01C 21/3617 (2013.01); G01C 21/3635 (2013.01); G01C 21/365 (2013.01)

(58) Field of Classification Search
  CPC ............ G01C 21/3461; G01C 21/3617; G01C 21/3635; G01C 21/365; B66F 9/0755
  See application file for complete search history.

(56) References Cited

U.S. PATENT DOCUMENTS

| 5,802,492 A * | 9/1998 | DeLorme | G09B 29/106 340/995.23 |
| 6,128,574 A * | 10/2000 | Diekhans | G05D 1/0278 701/410 |
| 9,734,639 B2 * | 8/2017 | Smith | G06V 20/593 |
| 2011/0098922 A1 * | 4/2011 | Ibrahim | B60W 40/08 701/532 |

(Continued)

FOREIGN PATENT DOCUMENTS

| JP | 59-201082 A | 11/1984 |
| JP | 2003-212072 A | 7/2003 |

(Continued)

*Primary Examiner* — Gertrude Arthur Jeanglaude
(74) *Attorney, Agent, or Firm* — Birch, Stewart, Kolasch & Birch, LLP

(57) ABSTRACT

A visibility support system includes: a positioning unit that estimates a position of an industrial vehicle; a route prediction unit that predicts a route of a part of the industrial vehicle or an object moving together with the industrial vehicle with reference to the position estimated, and calculates an interference position at which an obstacle interferes with the route on the basis of map data containing position information of the obstacle; a display unit configured to be worn on a head of a person, the display unit having transparency and being capable of displaying image data; and a control unit that displays image data of the route such that the image data is superimposed on a position of the route in a real world viewable through the display unit, the route starting from the part or the object at the position estimated and ending at the interference position.

9 Claims, 12 Drawing Sheets

(56) References Cited

U.S. PATENT DOCUMENTS

| | | | |
|---|---|---|---|
| 2020/0302780 A1* | 9/2020 | Awai | B60W 60/0016 |
| 2021/0370983 A1* | 12/2021 | Oba | G08G 1/166 |
| 2022/0197296 A1* | 6/2022 | Suzuki | G05D 1/0274 |

FOREIGN PATENT DOCUMENTS

| | | | |
|---|---|---|---|
| JP | 2006-96457 A | 4/2006 | |
| JP | 2006-303985 A | 11/2006 | |
| JP | 2020-23373 A | 2/2020 | |
| JP | 2022-34861 A | 3/2022 | |
| WO | WO 2019/183378 A1 | 8/2019 | |

* cited by examiner

VISIBILITY SUPPORT SYSTEM, INDUSTRIAL VEHICLE, VISIBILITY SUPPORT METHOD, AND PROGRAM

CROSS-REFERENCE TO RELATED APPLICATIONS

This application claims the benefit of priority to Japanese Patent Application Number 2022-205736 filed on Dec. 22, 2022. The entire contents of the above-identified application are hereby incorporated by reference.

TECHNICAL FIELD

The disclosure relates to a visibility support system, an industrial vehicle, a visibility support method, and a program.

RELATED ART

JP 59-201082 A discloses a system that calculates a driving operation necessary for parking based on data related to parking, such as an initial position of a host vehicle and a size of a parking lot, and a positioning result of a position of the host vehicle, and notifies a driver of the driving operation. This system makes it possible to, for example, understand the trajectory of rear wheels when the vehicle reverses for parking. In the case of driving a forklift, particularly when conveying cargo having a large width, it is necessary to confirm not only the trajectory of tires but also the side surfaces of the vehicle.

JP 2006-303985 A discloses a display device that captures an image of the surroundings of a host vehicle with a camera disposed around a vehicle body, creates an overhead view image representing an image of the surroundings around the host vehicle in a bird's eye view based on the captured image, and displays a region in which an object is likely to be present in a predicted route of the host vehicle in a real space such that the region is superimposed on the overhead view image. Generally, in an overhead view, a positional relationship of an object located at a position higher (or lower) than a reference plane (for example, the ground) is not correctly reproduced, which causes a difficulty in determining interference between a predicted route displayed according to the reference plane and a three-dimensional obstacle.

When augmented reality (AR) glasses are used, a virtual object of a predicted route by AR can be displayed in a superimposed manner in a real space. However, in displaying a virtual object in a simple manner, the virtual object is displayed on the near side of the obstacle, which causes difficulty in grasping a three-dimensional positional relationship between the predicted route and an obstacle (whether the predicted route is present on the near side of the obstacle or is in collision with the obstacle) and in determining the interference between the predicted route and the obstacle. On the other hand, the interference can be represented by recognizing the surrounding environment of the AR glasses, determining the overlap between the predicted route and the obstacle, and displaying the predicted route so as to be partially blocked (occlusion). However, this requires a sensor, and thus requires heavy processing. In addition, in the case of a forklift, blocking may be caused by the overlapping with a structure included in the host vehicle. For example, a predicted route of a leading end of a fork is blocked by a mast located on a near side of the predicted route when viewed from a driver. On the other hand, it is also possible to implement a function of recognizing the surrounding environment of the vehicle with a plurality of sensors attached around the vehicle, and causing the predicted route of the leading end of the fork to be blocked by the obstacle but not to be blocked by a structure (for example, the mast) of the host vehicle. However, the viewpoint of the AR glasses (the driver) and those of the sensors are different from each other, and thus the processing becomes complicated.

As a related technique, JP 2006-96457 A discloses a support device that detects a steering angle of a forklift, calculates a predicted trajectory of a leading end portion of a fork or a leading end portion of a conveyed object held by the fork when the forklift moves forward at the steering angle, superimposes the calculated predicted trajectory on an image obtained by imaging a front including the leading end portion of the fork, and displays the superimposed image on a monitor at a driver's seat. JP 2022-34861 A discloses a technique for estimating a self-position of a forklift.

SUMMARY

There is a need for a technique for displaying whether a predicted route interferes with an obstacle on the predicted route in an easily understood manner.

The present disclosure provides a visibility support system, an industrial vehicle, a visibility support method, and a program that can resolve the above-described problem.

A visibility support system according to the present disclosure includes: a positioning unit that estimates a position of an industrial vehicle; a route prediction unit that predicts a route of a part of the industrial vehicle or an object moving together with the industrial vehicle with reference to the position estimated, and calculate an interference position at which an obstacle interferes with the route on the basis of map data containing position information of the obstacle; a display unit configured to be worn on a head of a person, the display unit having transparency and being capable of displaying image data; and a control unit that displays image data of the route such that the image data is superimposed on a position of the route in a real world viewable through the display unit, the route starting from the part of the industrial vehicle or the object related to prediction of the route at the position estimated and ending at the interference position.

An industrial vehicle according to the present disclosure includes the visibility support system described above.

A visibility support method according to the present disclosure includes: estimating a position of an industrial vehicle; predicting a route of a part of the industrial vehicle or an object moving together with the industrial vehicle with reference to the position estimated, and calculating an interference position at which an obstacle interferes with the route on the basis of map data containing position information of the obstacle; and displaying image data of the route such that the image data is superimposed on a position of the route in a real world viewable through a display unit, the route starting from the part of the industrial vehicle or the object related to prediction of the route at the position estimated and ending at the interference position, the display unit being configured to be worn on a head of a person, having transparency, and being capable of displaying the image data.

A program according to the present disclosure executes: estimating a position of an industrial vehicle; predicting a route of a part of the industrial vehicle or an object moving together with the industrial vehicle with reference to the position estimated, and calculating an interference position at which an obstacle interferes with the route on the basis of map data containing position information of the obstacle; and displaying image data of the route such that the image data is superimposed on a position of the route in a real world viewable through a display unit, the route starting from the part of the industrial vehicle or the object related to prediction of the route at the position estimated and ending at the interference position, the display unit being configured to be worn on a head of a person, having transparency and being capable of displaying the image data.

According to the visibility support system, the industrial vehicle, the visibility support method, and the program described above, it is possible to display in an easily understood manner whether a predicted route of the industrial vehicle interferes with an obstacle on the predicted route.

BRIEF DESCRIPTION OF DRAWINGS

The disclosure will be described with reference to the accompanying drawings, wherein like numbers reference like elements.

DESCRIPTION OF EMBODIMENTS

Embodiments

A visibility support system according to the present disclosure will be described below with reference to the drawings.

Configuration

Figure 1:
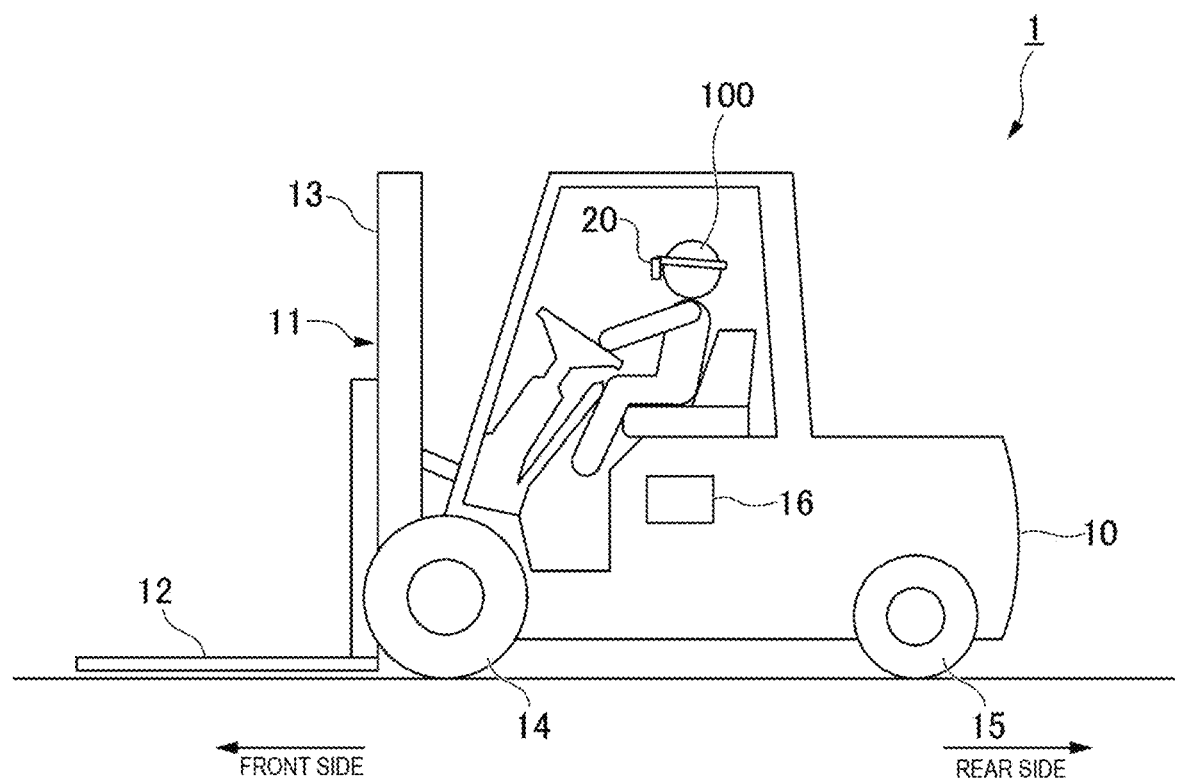
FIG. 1 is a schematic diagram illustrating an example of a forklift according to an embodiment.

FIG. 1 is a schematic diagram illustrating an example of a forklift according to each embodiment.

A forklift 1 includes a vehicle body 10, a cargo handling device 11, a route calculation device 16, and a display device 20. The vehicle body 10 includes a drive device (not illustrated), a steering device, and tires 14 and 15 driven by these devices, and causes the forklift 1 to travel. The cargo handling device 11 includes a fork 12 and a mast 13 that lifts and lowers the fork 12, and performs a cargo handling operation by lifting and lowering cargo loaded on the fork 12. The route calculation device 16 predicts a route of the forklift 1, confirms whether interference with an obstacle existing on the route occurs, and, when the interference occurs, calculates an interference position in the predicted route. The route calculation device 16 transmits information such as the predicted route and the interference position at which the interference with the obstacle occurs to the display device 20. The display device 20 is AR glasses or mixed reality (MR) glasses. A driver 100 wears the display device 20 and drives the forklift 1. The display device 20 displays the predicted route and the interference position calculated by the route calculation device 16 so as to be superimposed on the real world. In the present specification, as illustrated in FIG. 1, a side of the forklift 1 on which the cargo handling device 11 is provided is referred to as a front side, an opposite side is referred to as a rear side, and left and right sides when the forklift 1 faces the front side are referred to as a left side and a right side, respectively.

Figure 2:
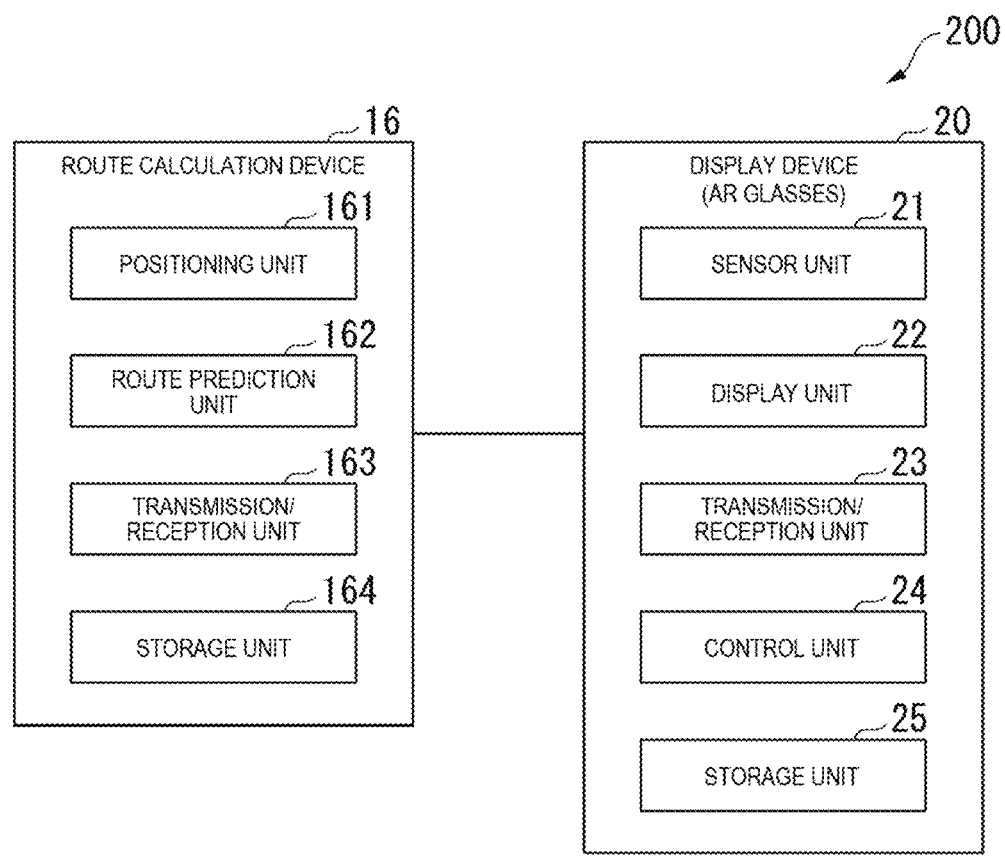
FIG. 2 is a block diagram illustrating an example of a visibility support system according to the embodiment.

FIG. 2 is a block diagram illustrating an example of a visibility support system according to the embodiment.

A visibility support system 200 includes the route calculation device 16 and the display device 20. The route calculation device 16 and the display device 20 are communicably connected to each other. The route calculation device 16 includes a computer. The display device 20 is AR glasses or MR glasses including a display device and a computer (hereinafter, collectively referred to as AR glasses).

Configuration of Route Calculation Device

As illustrated in the drawing, the route calculation device 16 includes a positioning unit 161, a route prediction unit 162, a transmission/reception unit 163, and a storage unit 164.

The positioning unit 161 includes, for example, a sensor for positioning purpose such as a global positioning system (GPS), an odometer, an inertial measurement unit (IMU), and a camera (not illustrated) mounted at the vehicle body 10, and estimates a position of the forklift 1 based on information detected by the sensor. A position estimation method may be any method. For example, as described in JP 2022-34861 A, the positioning unit 161 may perform position estimation by collating an image captured by a camera with a marker in a warehouse, may perform position estimation using a visual simultaneous localization and mapping (V-SLAM) technique, or may perform position estimation by an odometry. The positioning unit 161 does not need to include all of the sensors described above, and may perform position estimation using a sensor other than the sensors described above. The positioning unit 161 performs position estimation from moment to moment as a host vehicle travels.

Figure 3:
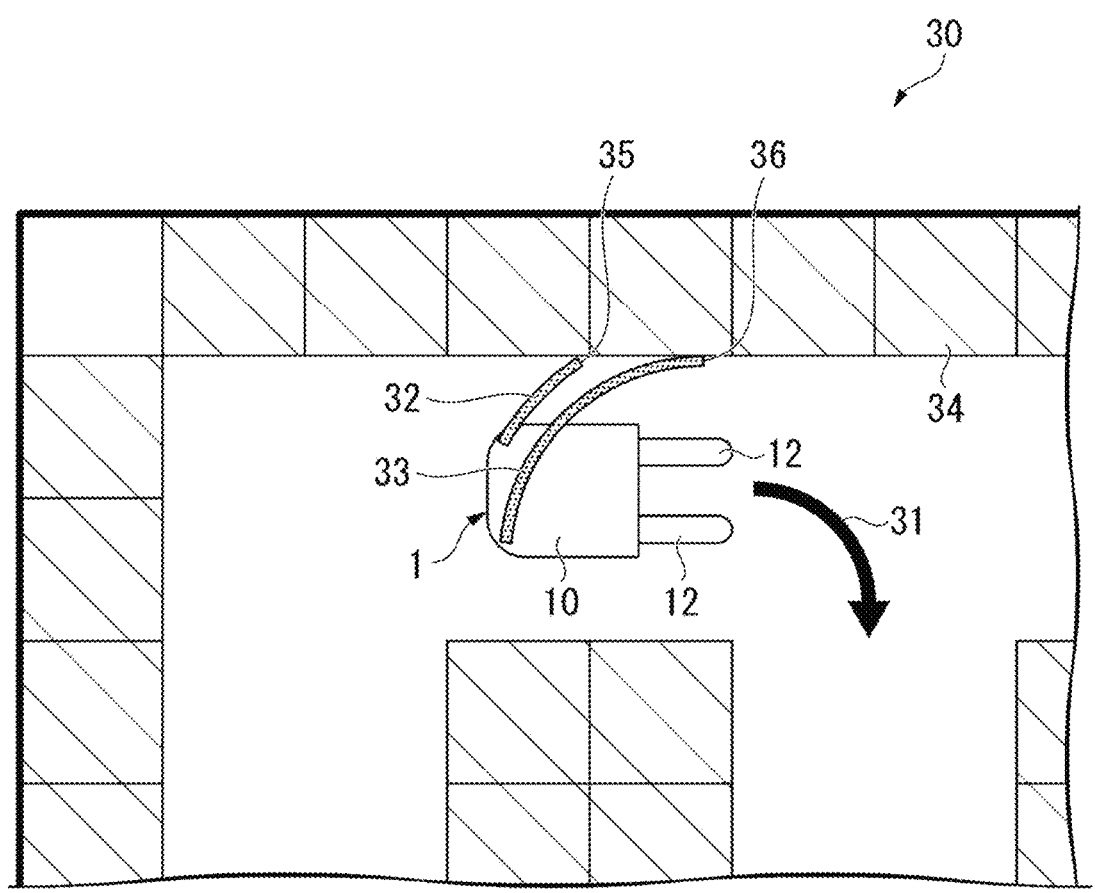
FIG. 3 is a first diagram for explaining calculation of interference between a predicted route and an obstacle according to the embodiment.

The route prediction unit 162 acquires information such as angles of the tires 14 and 15, a height of the fork 12, and a size in a height direction and a lateral direction of cargo loaded on the fork 12, and calculates a predicted route when the forklift 1 moves while maintaining a direction (forward, backward, left turn, right turn, or the like) based on these pieces of information and a distance from the tire 14 to the tire 15. For example, the route prediction unit 162 calculates a predicted route of a leading end of the fork 12, predicted routes of the left and right side surfaces of the cargo loaded on the fork 12, and predicted route(s) of the vehicle body 10 or the tires 14 and 15. Although a predicted route calculation process is not described in details, various methods provided in the related art can be used. The route prediction unit 162 updates a predicted route from moment to moment as the host vehicle travels. In addition, the route prediction unit 162 superimposes a predicted route on map data created in advance, determines whether interference with an obstacle occurs when the host vehicle travels along the predicted route, and, when interference with an obstacle occurs, calculates an interference position at which the interference with the obstacle occurs in the predicted route. Interference includes collision, contact, three-dimensional intersection, and the like. FIG. 3 illustrates a diagram in which a predicted route of the forklift 1 is superimposed on map data 30. The map data 30 contains position information of obstacles such as walls, shelves, and cargoes in a warehouse or the like in which the forklift 1 is operated, and is registered in the storage unit 164 in advance. In addition, preferably, the map data 30 also contains latest position information of cargoes and information about the sizes of the respective cargoes in consideration of the possibility that the cargo may constitute an obstacle when the cargo is temporarily placed on a passage or in an empty space or when the cargo is so large that the cargo sticks out to a passage even when placed on a shelf. For example, it may be configured such that a warehouse management system manages and updates the map data 30 to which the latest position information of cargoes and the information about the sizes in the height direction and the lateral direction of the respective cargoes are added, and the route calculation device 16 acquires the latest map data 30 from the warehouse management system. When the forklift 1 travels in the direction indicated by an arrow 31 as illustrated in FIG. 3, the route prediction unit 162 calculates predicted routes of the tire 15 on the left side and the tire 15 on the right side. A predicted route 32 is the predicted route of the tire 15 on the left side, and a predicted route 33 is the predicted route of the tire 15 on the right side. The route prediction unit 162 calculates, for each of the predicted routes, whether there is an obstacle such as a wall or cargo on the predicted route, and, when there is an obstacle, calculates an interference position between the predicted route and the obstacle. The interference position may have various shapes such as a point, a line, and a plane depending on the shape of an interfering object and a travel direction. In the example of FIG. 3, the route prediction unit 162 calculates an interference position 35 between the tire 15 on the left side and a wall 34 and an interference position 36 between the tire 15 on the right side and the wall 34. The route prediction unit 162 transmits information about the predicted routes 32 and 33 and the interference positions 35 and 36 calculated as above to the display device 20 through the transmission/reception unit 163. In the example of FIG. 3, the route prediction unit 162 transmits, for example, information that specifies the start points of the predicted routes 32 and 33 (for example, position information of the tires 15 on the left and right sides with reference to a predetermined position of the forklift 1), information that represents the shapes of the curves of the predicted routes 32 and 33 (for example, a function of the curves), and position information of the interference positions 35 and 36 (for example, coordinate information in a two-dimensional coordinate system with the start point of the predicted route 32 as the origin).

The transmission/reception unit 163 transmits and receives data to and from other devices. For example, the transmission/reception unit 163 transmits route information and the like to the display device 20 by wireless communication such as WiFi (registered trademark) or Bluetooth (registered trademark). In addition, the transmission/reception unit 163 acquires information detected by a sensor such as a GPS included in the positioning unit 161 and various sensors (not illustrated) that detect a height of the fork 12 and angles of the tires 14 and 15 from the sensors. Further, for example, in the case where the driver 100 reads information from a two-dimensional code attached to cargo by a bar code or the like when loading the cargo on the forklift 1, and where a warehouse management system manages the fact that the cargo has been loaded on the forklift 1 and the size of each cargo, the transmission/reception unit 163 receives the size information of the cargo from the warehouse management system.

The storage unit 164 stores the map data 30 containing the position information of obstacles, the information acquired by the transmission/reception unit 163, information about the size of the forklift 1 used for route prediction. The information about the size includes, for example, information about a distance between the tire 14 and the tire 15, a distance from a reference position to the leading end of the fork 12, a width of the vehicle body 10, and a height of the mast 13, and the size in the height direction and the lateral direction of the cargo being conveyed acquired from the warehouse management system or the like.

Configuration of Display Device

As illustrated in the drawing, the display device 20 includes a sensor unit 21, a display unit 22, a transmission/reception unit 23, a control unit 24, and a storage unit 25.

The sensor unit 21 includes a sensor for head tracking of the driver 100 (for example, a plurality of visible light cameras or an IMU), a sensor for eye tracking of the driver 100 (for example, an infrared camera), a depth sensor, a microphone, and the like.

The display unit 22 constitutes a lens (screen) portion of the AR glasses, and includes, for example, a transparent holographic display (through which the outside world can be seen). In a state where no virtual object is projected on the lens, the driver 100 can see the real world directly. A virtual object is image data projected on the display unit 22. When a virtual object is displayed on the display unit 22, the driver 100 sees the virtual object superimposed on the real world.

The transmission/reception unit 23 transmits and receives data to and from other devices. For example, the transmission/reception unit 23 receives route information and the like from the route calculation device 16 through wireless communication such as WiFi (registered trademark) or Bluetooth (registered trademark).

The control unit 24 performs display control and the like of the display unit 22. Based on the information detected by the sensor unit 21, the control unit 24 recognizes a shape of a surrounding space around the driver 100, creates three-dimensional map information of the surrounding space, and generates a virtual space. The control unit 24 arranges a virtual object at a desired position in the virtual space based on the created map information. Then, the virtual object is displayed to the driver 100 so as to be superimposed on an object existing at the corresponding position in the real world. For example, a virtual object can be displayed at an arbitrary position with reference to a predetermined position of the forklift 1. When a virtual object is arranged at the leading end of the fork 12, with reference to the center of a front wheel axle of the forklift 1, the positional relationship between the driver 100 and the leading end of the fork 12 can be calculated from the positional relationship between the driver 100 and the fork lift 1 and the positional relationship between the center of the front wheel axle of the forklift 1 and the leading end of the fork 12. The positional relationship between the driver 100 and the forklift 1 can be calculated by calibration (to be described below). The positional relationship between the center of the front wheel axle of the forklift 1 and the leading end of the fork 12 can be calculated from the design information of the forklift 1. When the control unit 24 arranges a virtual object at a position in the virtual space corresponding to the position of the leading end of the fork 12 with respect to the driver 100 calculated as above, the virtual object is recognized by the driver 100 as if being actually present at the leading end of the fork 12. For example, when a predicted route of the leading end of the fork 12 is displayed from the leading end of the fork 12 as a virtual object, the driver 100 can confirm a trajectory along which the leading end of the fork 12 will move in the future while driving, and can visually verify whether the leading end collides with an obstacle or the like. Based on the information detected by the sensor unit 21, the control unit 24 calculates the position of the head of the driver 100 when the driver 100 takes a posture such as bending down or leaning out from the driver's seat in the left-right direction. Then, based on the positional relationship between the head of the driver 100 and the virtual object, the control unit 24 generates and arranges the virtual object such that the virtual object appears to be the same as when the virtual object is actually present in the real world. Accordingly, even when the driver 100 changes his/her posture during driving, the driver 100 can see the virtual object of the predicted route arranged in the direction in which the driver 100 is looking. For example, in the case where both a predicted route of the leading end of the fork 12 and a predicted route of the tire 15 (rear wheel) are arranged as virtual objects, the driver 100 can see the predicted route of the leading end of the fork 12 when facing forward, and the driver 100 cannot see the predicted route of the leading end of the fork 12 and can see only the predicted route of the tire 15 when looking back.

The functions of the AR glasses include freely arranging a virtual object, arranging a virtual object at a desired position in a virtual space such that the virtual object appears as if being present at that position, and changing how a virtual object is seen in accordance with the posture of the driver 100. A user makes settings related to a desired virtual object on the display device 20 (a developer develops a virtual object using an AR development tool and implements a developed program on the display device 20). Then, the control unit 24 arranges the virtual object at a desired position according to the settings. In the present embodiment, the control unit 24 is configured to receive route information from the route calculation device 16 and display a virtual object of a predicted route indicated by the route information. For example, in displaying a predicted route of the leading end of the fork 12, when the forklift 1 is moving on a straight line without an obstacle, the route calculation device 16 transmits information specifying the leading end of the fork 12 which is the start point of the predicted route (for example, information indicating the positional relationship between the center of the front wheel axle of the forklift 1 and the leading end of the fork 12) and transmits information about the straight line and the direction and angle of the straight line (for example, the front) as information indicating the shape of the predicted route. Upon acquisition of these pieces of information, the control unit 24 specifies a position in a virtual space corresponding to the actual leading end of the fork 12 as a start point, and arranges a virtual object having a linear shape in the front direction from the start point. Accordingly, the driver 100 can recognize the predicted route of the leading end of the fork 12 and recognize that there is no obstacle ahead. Further, in a similar situation, when there is an obstacle on the right side at a distance of 5 m ahead, the route calculation device 16 provides information specifying the leading end of the fork 12 as a start point, a straight line as the shape of a predicted route, and coordinate information as interference position on the right side at a distance of 5 m ahead. Upon acquisition of these pieces of information, the control unit 24 arranges a virtual object having a linear shape in the front direction with the leading end as a start point for the fork 12 on the left side, and arranges a virtual object having a linear shape in the front direction with the leading end as a start point only up to 5 m ahead for the fork 12 on the right side. When viewed from the driver 100, the straight line of the predicted route of the fork 12 on the left side extends far ahead, and the straight line of the predicted route of the fork 12 on the right side extends up to the obstacle 5 m ahead and appears to be cut there. This indicates that the route of the fork 12 on the right side is blocked by the obstacle because the obstacle is present on the near side of the cut route. As described above, in the present embodiment, when a predicted route interferes with an obstacle, the predicted route is cut at an interference position, and displayed with the far side of the interference position blocked (pseudo occlusion). Accordingly, the driver 100 can recognize that the fork 12 will interfere with the obstacle ahead on the right side when the fork 12 is moved forward in this situation. Each of FIGS. 4A to 6 illustrates an example of a virtual object of a predicted route as viewed from the driver 100 wearing the display device 20. A virtual object of a predicted route is referred to as a "predicted virtual route".

Figure 4A:
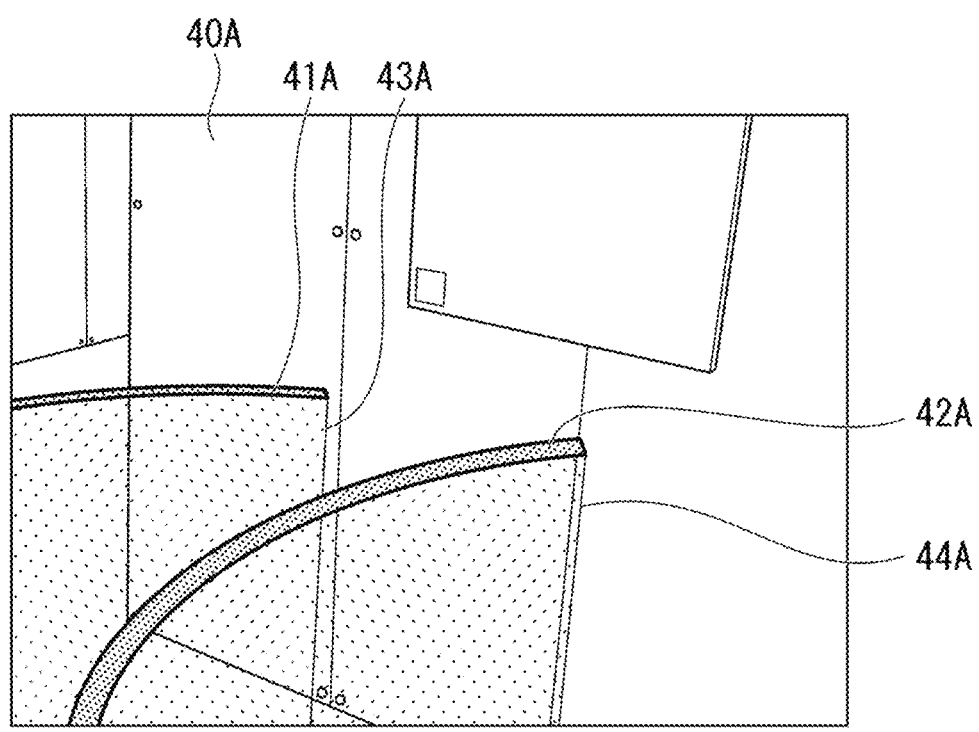
FIG. 4A is a first diagram illustrating a display example of a predicted virtual route according to the embodiment.

FIG. 4A illustrates a display example of a predicted virtual route of the tire 15. A predicted virtual route 41A is a predicted route of the tire 15 on the left side, and a predicted virtual route 42A is a predicted route of the tire 15 on the right side. An interference position 43A is an interference position between the tire 15 on the left side and a wall 40A, and an interference position 44A is an interference position between the tire 15 on the right side and the wall 40A.

Figure 4B:
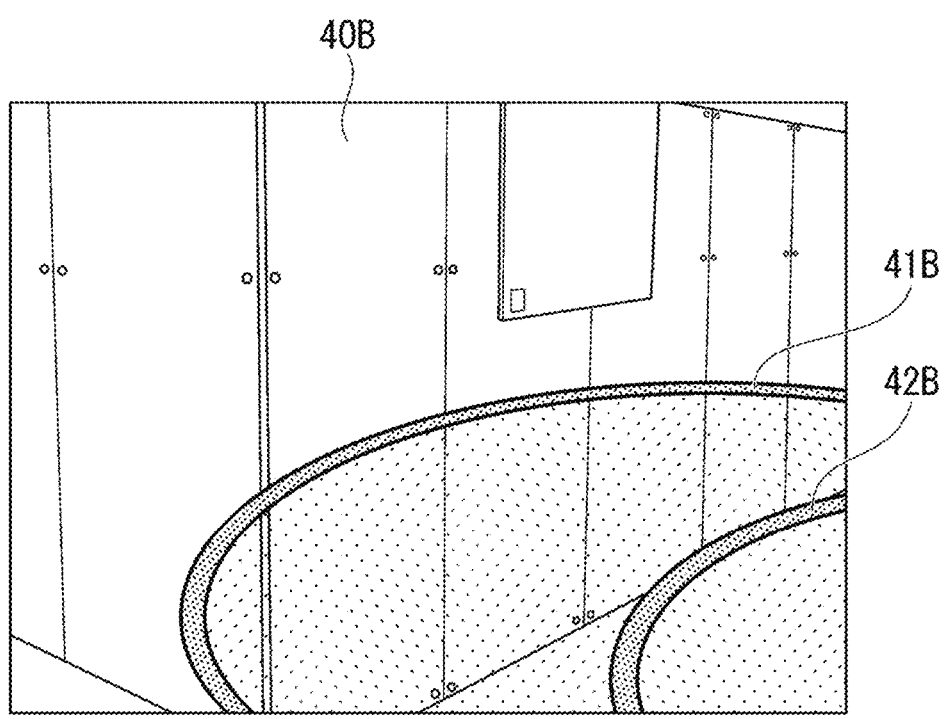
FIG. 4B is a first diagram illustrating a display example when an interference position at which interference with an obstacle occurs is not displayed.

FIG. 4B illustrates a display example of a predicted virtual route in which no interference position is displayed even though the predicted route interferes with an obstacle. A predicted virtual route 41B is a predicted route of the tire 15 on the left side, and a predicted virtual route 42B is a predicted route of the tire 15 on the right side. Referring to FIG. 4B, since the predicted virtual routes of the tires 15 on the left and right sides are displayed so as to be superimposed on a wall 40B, it is difficult for the driver 100 to determine whether there is interference between the tires 15 on the left and right sides and the wall 40B. On the other hand, as illustrated in FIG. 4A, when the predicted virtual routes 41A and 42A are displayed as being cut at the interference positions 43A and 44A, the driver 100 can easily recognize the interference with the obstacle.

Figure 5A:
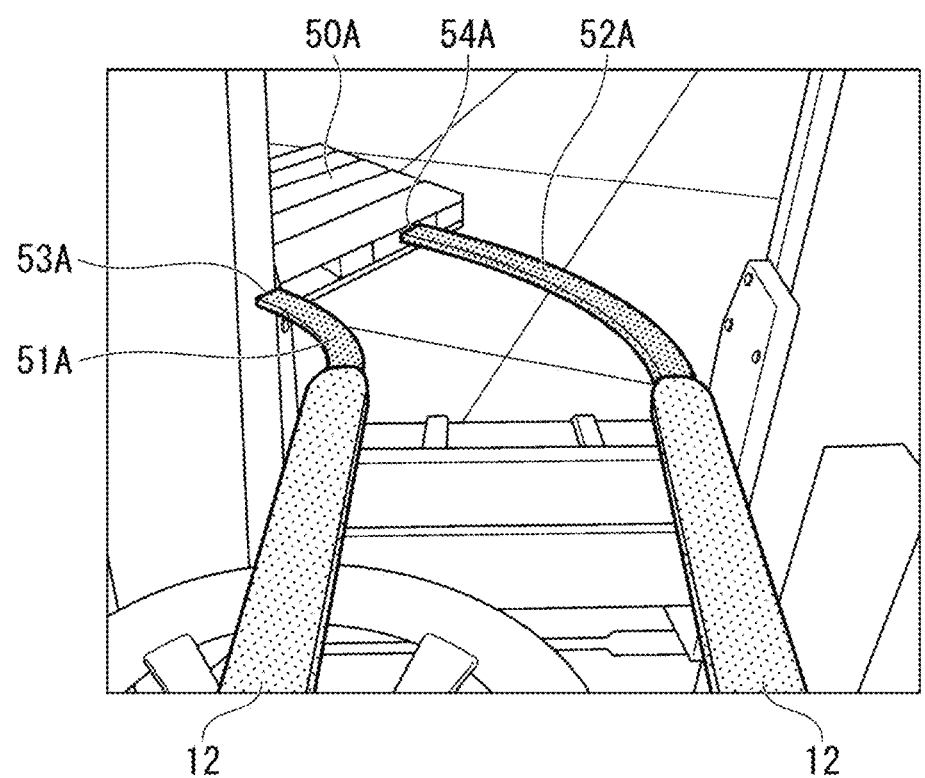
FIG. 5A is a second diagram illustrating a display example of a predicted virtual route according to the embodiment.

FIG. 5A illustrates a display example of a predicted virtual route of the leading end of the fork 12. FIG. 5A illustrates a situation in which the leading end of the fork 12 is inserted into a hole in a pallet 50A. When the pallet 50A as a work object is regarded as an obstacle, displaying the predicted route of the leading end of the fork 12 is useful for determining whether the route is appropriate as it is. A predicted virtual route 51A is a predicted route of the leading end of the fork 12 on the left side, and a predicted virtual route 52A is a predicted route of the leading end of the fork 12 on the right side. An interference position 53A is an interference position between the leading end of the fork 12 on the left side and the pallet 50A, and an interference position 54A is an interference position between the leading end of the fork 12 on the right side and the pallet 50A. In FIG. 5A, and in FIGS. 5B and 6 to be described below, the fork 12 is displayed on the near side of the mast 13 without using an occlusion function so that the fork 12 can be easily recognized, but this is not relevant to any function according to the present embodiment.

Figure 5B:
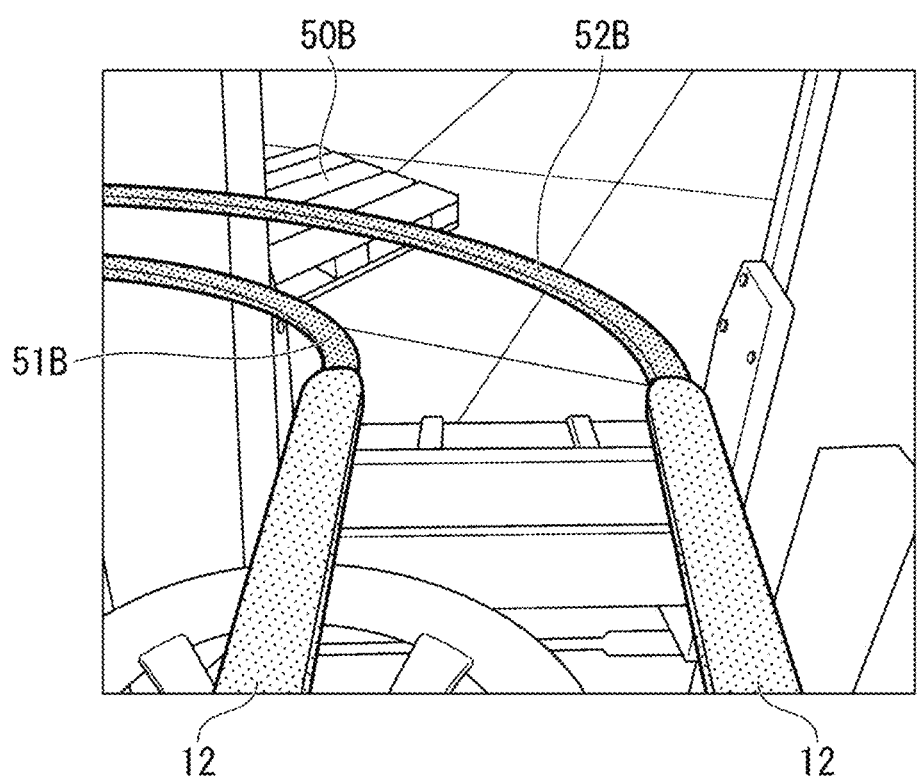
FIG. 5B is a second diagram illustrating a display example when an interference position at which interference with an obstacle occurs is not displayed.

FIG. 5B illustrates a display example of a predicted virtual route in which no interference position is displayed even though the predicted route interferes with an obstacle (pallet 50B). A predicted virtual route 51B is a predicted route of the leading end of the fork 12 on the left side, and a predicted virtual route 52B is a predicted route of the leading end of the fork 12 on the right side. Referring to FIG. 5B, since the predicted virtual routes of the leading ends of the fork 12 on the left and right sides are displayed so as to be superimposed on the pallet 50B, it is difficult for the driver 100 to determine whether the fork 12 can be inserted into a hole of the pallet 50B or the fork 12 passes above the pallet 50B. On the other hand, as illustrated in FIG. 5A, when the predicted virtual routes 51A and 52A are displayed as being cut at the interference positions 53A and 54A, the driver 100 can easily confirm whether the leading end of the fork 12 can be inserted in the hole of the pallet 50A.

Figure 6:
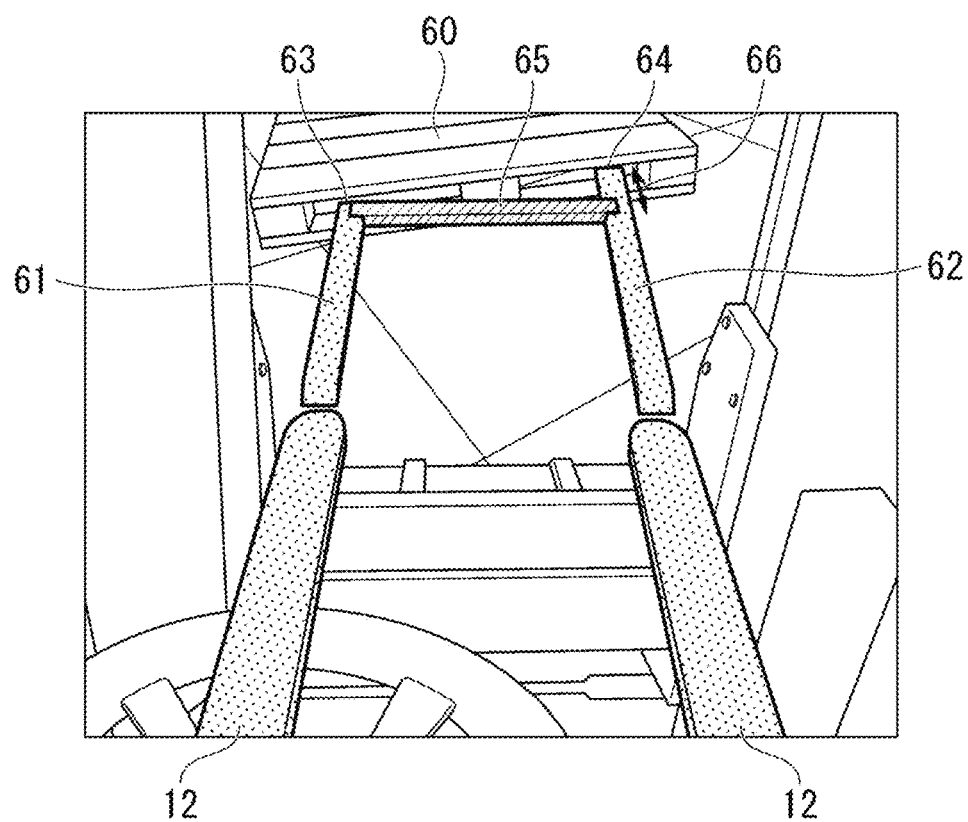
FIG. 6 is a third diagram illustrating a display example of a predicted virtual route according to the embodiment.

FIG. 6 illustrates a display example of displaying, as a virtual object, whether the leading end of the fork 12 on the left side or the leading end of the fork 12 on the right side will interfere with an obstacle first. Similar to FIG. 5A, predicted virtual routes 61 and 62 are predicted routes of the leading ends of the fork 12 on the left and right sides, respectively, and interference positions 63 and 64 are interference positions between the leading ends of the fork 12 on the left and right sides and a pallet 60, respectively. The control unit 24 displays an auxiliary line 65 as a perpendicular line from the interference position 63, which is the closer to the driver 100 of the interference positions 63 and 64, to the predicted virtual route 62. The auxiliary line 65 is a virtual object. Accordingly, the driver 100 can recognize whether the leading end of the fork 12 on the left side or the leading end of the fork 12 on the right side will interfere with the pallet 60 first (the leading end on the left side interferes with the pallet 60 first). In addition, by displaying the auxiliary line 65, it is possible to grasp a distance 66 in a depth direction between the interference position 63 and the interference position 64, and it is easy to grasp to what degree the fork 12 faces the pallet 60.

In this way, when there is a plurality of interference positions, the control unit 24 may perform display to clarify a position at which interference occurs first. As other display examples, in FIG. 6, the control unit 24 may change the color of the interference position 63, cause the interference position 63 to blink, indicate the interference position 63 with an arrow or the like, or display a signage such as "Interference" near the interference position 63.

Figure 7:
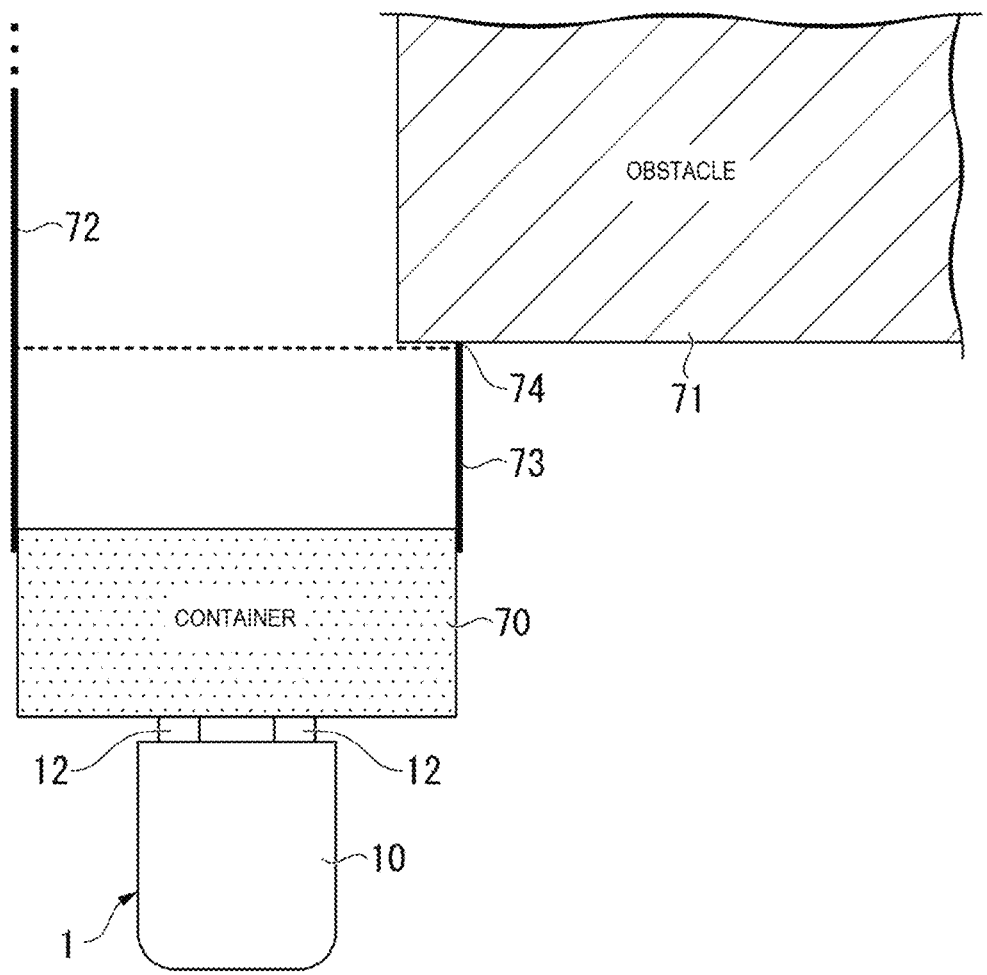
FIG. 7 is a second diagram for explaining calculation of interference between a predicted route and an obstacle according to the embodiment.

In the above description, the display examples of a predicted virtual route of the leading end of the fork 12 and a predicted virtual route of the tire 15 have been described. Predicted virtual routes to be displayed are not limited thereto, and a predicted virtual route can be displayed for a position of any other part of the forklift 1 (for example, an upper end of the mast 13, or the left and right side surfaces of the vehicle body 10). Further, a predicted virtual route may be displayed not only for a part of the forklift 1 but also for cargo loaded on the forklift 1. For example, when a container 70 having a wide width is conveyed as illustrated in FIG. 7, even when the forklift 1 itself does not interfere with an obstacle 71, the container 70 may interfere with the obstacle 71. The route prediction unit 162 of the route calculation device 16 acquires information about the size of the container 70 in the height direction and the lateral direction from, for example, a warehouse management system, and calculates a predicted route 72 of the left side surface of the container 70 and a predicted route 73 of the right side surface of the container 70 with reference to a position estimated by the positioning unit 161. In addition, the route prediction unit 162 collates the calculated predicted routes 72 and 73 with the map data 30 to verify whether there is interference between the predicted routes 72 and 73 and the obstacle 71 which is a wall, cargo, or the like included in the map data 30. When there is the interference, the route prediction unit 162 calculates, for example, a coordinate position of an interference position 74 with reference to a predetermined position of the forklift 1. The display device 20 displays a predicted virtual route on the display unit 22 based on the predicted routes 72 and 73 and the interference position 74 calculated by the route prediction unit 162. Since the predicted virtual route (not illustrated) is displayed on the near side, the driver 100 can recognize the predicted route of the container 70 even when the field of view of the driver 100 is blocked by the container 70 having a wide width. Further, for the predicted route 73 on the right side, since the predicted virtual route is cut off at the interference position 74 at which the interference with the obstacle 71 occurs, the driver 100 can confirm the interference with the obstacle 71. Although FIG. 7 exemplifies a situation in which the forklift 1 loaded with the container 70 moves forward, a predicted route and an interference position can be calculated and a predicted virtual route can be displayed in the same manner when the forklift 1 reverses.

Figure 8:
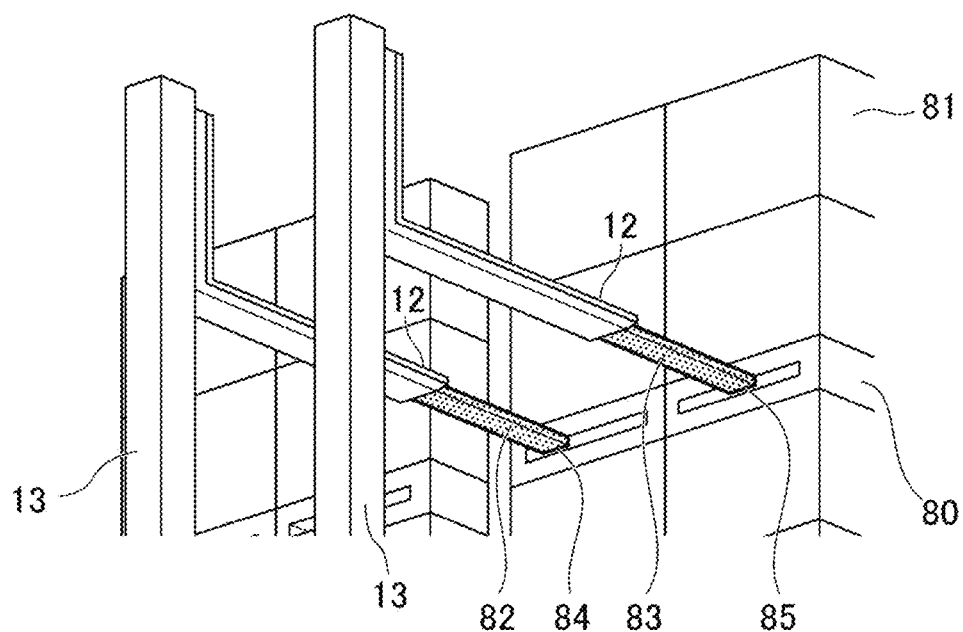
FIG. 8 is a fourth diagram illustrating a display example of a predicted virtual route according to the embodiment.

Although interference in a two-dimensional direction between a predicted route and an obstacle has been described above, it is desirable to be able to display a predicted route and interference with an obstacle at a position of the fork 12 in the height direction in a situation where the fork 12 is lifted to perform cargo handling work. For this purpose, position information of an obstacle for each height is added to the map data 30, and then the route prediction unit 162 recognizes a height of the fork 12, for example, by a lifting height sensor provided at the mast 13, and reads a position of an obstacle at the recognized height from the map data 30. Then, the route prediction unit 162 calculates a predicted route and an interference position at which interference with the obstacle occurs at the height of the fork 12 by using angles of the tires 14 and 15, a size of cargo, and the like in the same manner as in the two-dimensional situation. The display device 20 displays a predicted virtual route on the display unit 22 based on the predicted route and the interference position at the height of the fork 12 calculated by the route prediction unit 162. FIG. 8 illustrates an example of visual information that the driver 100 wearing the display device 20 can see when the drive 100 leans to the right side of the driver's seat and looks upward while the fork 12 is lifted and inserted into a hole of a pallet 80 loaded with a cargo 81. Predicted virtual routes 82 and 83 are predicted routes of the leading ends of the fork 12 on the left and right sides, respectively, and interference positions 84 and 85 are interference positions between the leading ends of the fork 12 on the left and right sides and the pallet 80, respectively. By displaying a predicted virtual route with consideration of height, the driver 100 can perform cargo handling work while visually recognizing the predicted route of the fork 12 at a target working position and interference with the pallet 80 or the cargo 81. Further, by displaying a predicted virtual route with consideration of height, it is possible to prevent the occurrence of a phenomenon in which a display of a predicted virtual route is cut off when the fork 12 is moving while being lifted even though there is actually only an obstacle whose height is lower than the height of the fork 12 (for example, when the fork 12 passes above cargo directly placed on a floor).

The storage unit 25 stores information detected by the sensor unit 21, information received by the transmission/reception unit 23, CAD information of the forklift 1 or various types of forklifts, and the like.

Operation

Next, a flow of display processing of a predicted virtual route will be described with reference to FIG. 9.

Figure 9:
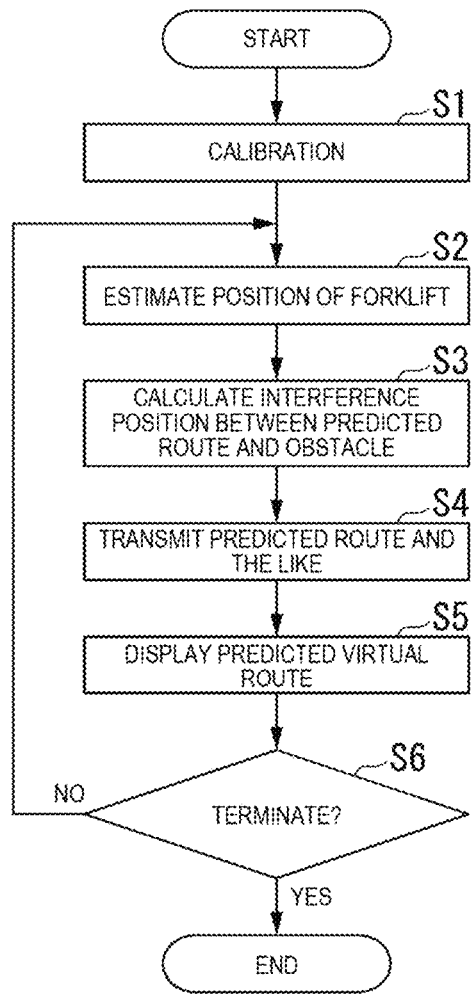
FIG. 9 is a flowchart illustrating an example of display processing of a predicted virtual route according to the embodiment.

FIG. 9 is a flowchart illustrating an example of display control of a virtual monitor according to the embodiment.

The driver 100 wearing the display device 20 sits on the driver's seat of the forklift 1, activates the display device 20, and performs calibration (step S1). In the calibration, the positional relationship between the driver 100 and the forklift 1 is calculated. For example, the control unit 24 recognizes a steering wheel or other structures of the forklift 1 by the visible light camera of the sensor unit 21, and estimates the vehicle type of the forklift 1 from the shape and appearance of the captured steering wheel or the like. The control unit 24 reads CAD information corresponding to the estimated vehicle type from the CAD information recorded in the storage unit 25, and grasps the entire shape of the forklift 1. In addition, for example, the control unit 24 calculates the positional relationship between the driver 100 and the steering wheel, that is, a position on the driver's seat at which the driver 100 is seated, or a height of the head of the driver 100, by analyzing the image of the steering wheel captured by the visible light camera of the sensor unit 21 or measuring a distance to the steering wheel with the depth sensor of the sensor unit 21, or calculates the positional relationship between the driver 100 and each part of the forklift 1 (a distance in the horizontal direction, a distance in the vertical distance, and the like) from the read CAD information of the forklift 1. Accordingly, distances from the driver 100 to the leading end of the fork 12, to the tires 15 on the left and right sides, and to both side surfaces of the cargo can be grasped (the size of the cargo is also required for grasping the distance to the both side surfaces of the cargo), and thus a predicted virtual route can be arranged at an accurate position (in accordance with the position of the leading end of the fork 12 or the like in the real world). In addition, for example, a two-dimensional marker may be provided at a predetermined position of the forklift 1 (for example, the driver's seat side of the mast 13), the two-dimensional marker may be recognized by the sensor unit 21, and the positional relationship between the driver 100 and each part of the forklift 1 may be calculated in the same manner as described above based on the positional relationship with the two-dimensional marker, the vehicle type of the forklift 1 indicated by the two-dimensional marker, and the CAD information of the vehicle type.

Upon completion of the calibration, the driver 100 performs a predetermined operation on the display device 20 to activate a function of displaying a predicted virtual route. Further, the driver 100 performs a predetermined operation to activate the route calculation device 16. When the route calculation device 16 is activated, the positioning unit 161 estimates a position (predetermined reference position) of the forklift 1 (step S2). Next, the route prediction unit 162 calculates an interference position between a predicted route and an obstacle (step S3). Next, the route prediction unit 162 transmits information about the predicted route and the like to the display device 20 through the transmission/reception unit 163 (step S4). For example, in the case of the predicted routes of the tires 15 illustrated in FIG. 3, when each of the predicted routes 32 and 33 is a part of an arc, the route prediction unit 162 transmits information specifying the tires 15 on the left and right sides as the start points, information of the predicted routes such as the radius, the center position, and the angle of each arc, and coordinate information of the interference positions 35 and 36 to the display device 20. In the display device 20, the control unit 24 acquires the information about the predicted route and the like transmitted by the route prediction unit 162 through the transmission/reception unit 23. The control unit 24 displays a predicted virtual route on the display unit 22 (step S5). For example, the control unit 24 generates a virtual object of an arc specified for the tire 15 on the left side, and arranges the generated virtual object of the arc with a position corresponding to the tire 15 on the left side in a virtual space as a start point. The virtual object may be a virtual object representing only the arc or a virtual object having a fan shape that transparently represents the arc and a circle surrounded by the arc. Similarly, the control unit 24 generates a virtual object for the tire 15 on the right side and arranges the virtual object along the predicted route indicated by the route information transmitted from the route calculation device 16 with the tire 15 on the right side as a start point. Accordingly, the driver 100 can confirm the predicted virtual routes 41A and 42A illustrated in FIG. 4A.

Next, the control unit 24 determines whether to terminate the display of the predicted virtual route (step S6). For example, when the driver 100 performs an operation to terminate the function of displaying a predicted virtual route, the control unit 24 determines to terminate the function of displaying a predicted virtual route, otherwise determines not to terminate the function. When it is determined not to terminate the function (step S6; No), the processing in and after step S2 is repeatedly performed. The positioning unit 161 estimates the position of the forklift 1 from moment to moment, and the route prediction unit 162 updates the predicted route of the forklift 1 based on a steering angle or the like from moment to moment. The display device 20 arranges the predicted virtual route on a virtual space based on the predicted route calculated by the route prediction unit 162 or the like. Accordingly, the driver 100 can drive the forklift 1 while checking a future route of the forklift 1 that changes as the driver 100 drives the forklift 1. On the other hand, when it is determined to terminate the function (step S6; Yes), the processing flow of FIG. 8 is ended.

In the above-described embodiment, a case where the visibility support system 200 is applied to the forklift 1 has been described as an example. However, the visibility support system 200 can also be applied to industrial vehicles other than a forklift, such as a power shovel, a bulldozer, a crane truck, and a reach stacker. The fork 12 of the forklift 1, a boom and a bucket of a power shovel, a bucket and an arm of a bulldozer, a boom, a jib, a hook, and the like of a crane truck are examples of a work device included in an industrial vehicle. In addition, an object such as cargo, soil and sand, or debris to be conveyed or the like by the work device is an example of an object that moves together with an industrial vehicle. In the above-described embodiment, the route calculation device 16 is provided at the forklift 1. However, functions and components other than the positioning unit 161 may be implemented at an external computer or the display device 20. When the functions and components are implemented at the display device 20, the functions and components including the positioning unit 161 may be implemented at the display device 20.

Effects

In the present embodiment, a driver wears AR glasses (display device 20), and a predicted virtual route is displayed on a virtual space. Further, the position of an obstacle is grasped based on map data of a warehouse, the overlap between the predicted virtual route and the obstacle is determined, and the predicted virtual route is blocked. Accordingly, whether a predicted route interferes with an obstacle on the predicted route can be displayed in an easily understood manner. In addition, by displaying the predicted route so as to be superimposed on the real world using the AR glasses, the driver 100 does not need to check a monitor or the like at the driver's seat and can check the predicted route with a line of sight.

Figure 10:
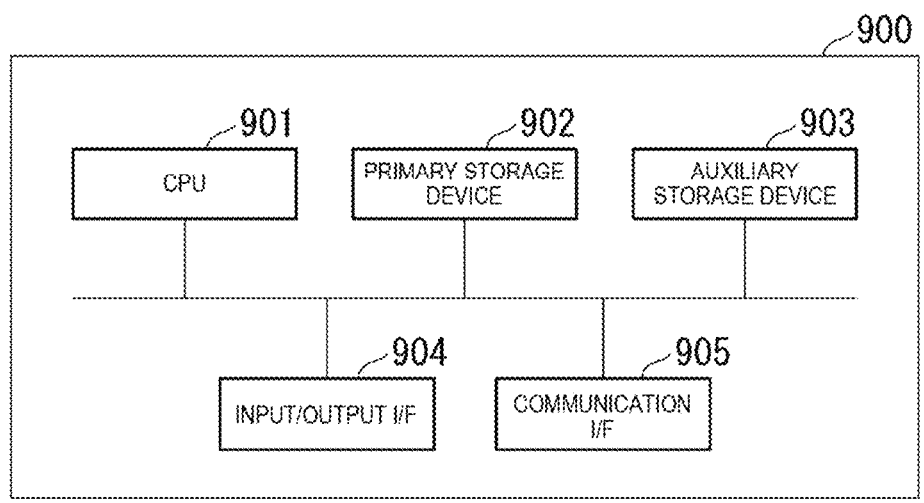
FIG. 10 is a diagram illustrating an example of a hardware configuration of the visibility support system according to the embodiment.

FIG. 10 is a diagram illustrating an example of a hardware configuration of the visibility support system according to the embodiment. A computer 900 includes a CPU 901, a primary storage device 902, an auxiliary storage device 903, an input/output interface 904, and a communication interface 905.

The route calculation device 16 and the display device 20 described above are implemented in the computer 900. The functions described above are stored in the auxiliary storage device 903 in a format of a program. The CPU 901 reads the program from the auxiliary storage device 903, loads the program into the primary storage device 902, and executes the above-mentioned processing in accordance with the program. The CPU 901 secures a storage area in the primary storage device 902 in accordance with the program. The CPU 901 secures a storage area for storing data under processing in the auxiliary storage device 903 in accordance with the program.

A program for implementing the whole or part of the functions of the route calculation device 16 and the display device 20 may be recorded in a computer readable recording medium, and a computer system may be caused to read and execute the program recorded in the recording medium to execute the processing of the respective functional units. The "computer system" here includes hardware such as an operating system (OS) or peripheral equipment. In addition, if a WWW system is used, the "computer system" also includes a home page providing environment (or a display environment). The "computer readable recording medium" refers to a portable medium such as a CD, a DVD, or a USB device, or a storage device such as a hard disk built in the computer system. Further, when this program is distributed to the computer 900 through a communication line, the computer 900 having received the distribution may load the program into the primary storage device 902, and may execute the above-mentioned processing. The above-described program may implement part of the functions described above, and furthermore, also implement the functions described above in combination with a program already recorded in the computer system.

In the foregoing, certain embodiments of the present disclosure have been described, but all of these embodiments are merely illustrative and are not intended to limit the scope of the disclosure. These embodiments may be implemented in various other forms, and various omissions, substitutions, and alterations may be made without departing from the gist of the disclosure. These embodiments and modifications are included in the scope and gist of the disclosure and are also included in the scope of the disclosure described in the claims and equivalents thereof.

SUPPLEMENTARY NOTES

The visibility support system, the industrial vehicle, the visibility support method, and the program described in each of the embodiments are understood as follows, for example.

(1) A visibility support system according to a first aspect includes: a positioning unit that estimates a position of an industrial vehicle; a route prediction unit that predicts a route of a part of the industrial vehicle or an object moving together with the industrial vehicle with reference to the position estimated, and calculates an interference position at which an obstacle interferes with the route on the basis of map data containing position information of the obstacle; a display unit configured to be worn on a head of a person, the display unit having transparency and being capable of displaying image data; and a control unit that displays image data of the route such that the image data is superimposed on a position of the route in a real world viewable through the display unit, the route starting from the part of the industrial vehicle or the object related to prediction of the route at the position estimated and ending at the interference position.

Whether a predicted route of an industrial vehicle interferes with an obstacle on the predicted route can be displayed in an easily understood manner.

(2) A visibility support system according to a second aspect is the visibility support system of (1), wherein the route prediction unit calculates the interference position by predicting the route of a work device included in the industrial vehicle.

In the industrial vehicle, the work device (a fork of a forklift) may protrude from a vehicle body. In that case, it is necessary to drive the industrial vehicle with attention to interference between the work device and an obstacle. In view of this, a predicted route and an interference position of the work device of the industrial vehicle can be calculated.

(3) A visibility support system according to a third aspect is the visibility support system of (1) to (2), wherein the route prediction unit calculates the interference position by predicting the route of a work object conveyed by the industrial vehicle.

With this configuration, for example, even when a forklift conveys cargo having a width larger than the width of the vehicle body, predicted routes and interference positions for both side surfaces of the cargo can be calculated.

(4) A visibility support system according to a fourth aspect is the visibility support system of (1) to (3), wherein the route prediction unit calculates the interference position at a predetermined height by predicting the route of the part of the industrial vehicle or the object related to the prediction of the route at the predetermined height.

With this configuration, for example, even when the shape and size of the industrial vehicle and the distribution of the obstacle are different at each height, it is possible to calculate the predicted route and the interference position according to height.

(5) A visibility support system according to a fifth aspect is the visibility support system of (4), wherein the route prediction unit calculates the interference position at the predetermined height on the basis of the map data containing position information of the obstacle at different heights.

With this configuration, interference positions at various heights can be calculated.

(6) A visibility support system according to a sixth aspect is a visibility support system including a route calculation device and a display device. The route calculation device includes: a positioning unit that estimates a position of an industrial vehicle; a route prediction unit that predicts a route of a part of the industrial vehicle or an object moving together with the industrial vehicle with reference to the position estimated, and calculates an interference position at which an obstacle interferes with the route on the basis of map data containing position information of the obstacle; and a transmission unit that transmits specifying information specifying the part of the industrial vehicle or the object related to prediction of the route and information of the route ending at the interference position to the display device. The display device includes: a reception unit that receives the specifying information and the information of the route ending at the interference position; a display unit configured to be worn on a head of a person, the display unit having transparency and being capable of displaying image data; and a control unit that displays image data of the route such that the image data is superimposed on a position of the route in a real world viewable through the display unit, the route starting from the part of the industrial vehicle or the object related to the prediction of the route indicated by the specifying information at the position estimated and ending at the interference position.

With this configuration, whether a predicted route interferes with an obstacle on the predicted route is displayed in an easily understood manner.

(7) An industrial vehicle according to a seventh aspect includes the visibility support system of (1) to (6).

(8) A visibility support method according to an eighth aspect includes: estimating a position of an industrial vehicle; predicting a route of a part of the industrial vehicle or an object moving together with the industrial vehicle with reference to the position estimated, and calculating an interference position at which an obstacle interferes with the route on the basis of map data containing position information of the obstacle; and displaying image data of the route such that the image data is superimposed on a position of the route in a real world viewable through a display unit, the route starting from the part of the industrial vehicle or the object related to prediction of the route at the position estimated and ending at the interference position, the display unit being configured to be worn on a head of a person, having transparency, and being capable of displaying the image data.

(9) A program according to a ninth aspect causes a computer to execute: estimating a position of an industrial vehicle; predicting a route of a part of the industrial vehicle or an object moving together with the industrial vehicle with reference to the position estimated, and calculating an interference position at which an obstacle interferes with the route on the basis of map data containing position information of the obstacle; and displaying image data of the route such that the image data is superimposed on a position of the route in a real world viewable through a display unit, the route starting from the part of the industrial vehicle or the object related to prediction of the route at the position estimated and ending at the interference position, the display unit being configured to be worn on a head of a person, having transparency and being capable of displaying the image data.

While preferred embodiments of the invention have been described as above, it is to be understood that variations and modifications will be apparent to those skilled in the art without departing from the scope and spirit of the invention.

The scope of the invention, therefore, is to be determined solely by the following claims.

The invention claimed is:

1. A visibility support system comprising:
    a non-transitory memory configured to store a program; and
    a processor configured to execute the program and control the visibility support system to operate as:
    a positioning unit configured to estimate a position of an industrial vehicle;
    a route prediction unit configured to predict a route of a part of the industrial vehicle or an object moving together with the industrial vehicle with reference to the position estimated, and calculate an interference position at which an obstacle interferes with the route on the basis of map data containing position information of the obstacle;
    a display unit configured to be worn on a head of a person, the display unit having transparency and being capable of displaying image data; and
    a control unit configured to display image data of the route such that the image data is superimposed on a position of the route in a real world viewable through the display unit, the route starting from the part of the industrial vehicle or the object related to prediction of the route at the position estimated and ending at the interference position,
    wherein the control unit is configured to, when the route interferes with the obstacle, display the image data of the route ending at the interference position by cutting the route at the interference position, and displaying with a far side of the interference position blocked.

2. The visibility support system according to claim 1, wherein the route prediction unit calculates the interference position by predicting the route of a work device included in the industrial vehicle.

3. The visibility support system according to claim 1, wherein the route prediction unit calculates the interference position by predicting the route of a work object conveyed by the industrial vehicle.

4. The visibility support system according to claim 1, wherein the route prediction unit calculates the interference position at a predetermined height by predicting the route of the part of the industrial vehicle or the object related to the prediction of the route at the predetermined height.

5. The visibility support system according to claim 4, wherein the route prediction unit calculates the interference position at the predetermined height on the basis of the map data containing position information of the obstacle at different heights.

6. An industrial vehicle comprising the visibility support system according to claim 1.

7. A visibility support system comprising:
    a route calculation device; and
    a display device,
    the route calculation device including
    a first non-transitory memory configured to store a first program; and
    a first processor configured to execute the first program and control the route calculation device to operate as:
    a positioning unit configured to estimate a position of an industrial vehicle,
    a route prediction unit configured to predict a route of a part of the industrial vehicle or an object moving together with the industrial vehicle with reference to the position estimated, and calculate an interference position at which an obstacle interferes with the route on the basis of map data containing position information of the obstacle, and a transmission unit configured to transmit, to the display device, specifying information specifying the part of the industrial vehicle or the object related to prediction of the route and information of the route ending at the interference position, the display device including a second non-transitory memory configured to store a second program; and a second processor configured to execute the second program and control the display device to operate as:

a reception unit configured to receive the specifying information and the information of the route ending at the interference position, a display unit configured to be worn on a head of a person, the display unit having transparency and being capable of displaying image data, and a control unit configured to display image data of the route such that the image data is superimposed on a position of the route in a real world viewable through the display unit, the route starting from the part of the industrial vehicle or the object indicated by the specifying information at the position estimated and ending at the interference position, wherein the control unit is configured to, when the route interferes with the obstacle, display the image data of the route ending at the interference position by cutting the route at the interference position, and displaying with a far side of the interference position blocked.

8. A visibility support method comprising:

estimating, by a computer, a position of an industrial vehicle;

predicting, by a computer, a route of a part of the industrial vehicle or an object moving together with the industrial vehicle with reference to the position estimated and calculating an interference position at which an obstacle interferes with the route on the basis of map data containing position information of the obstacle; and displaying, by a computer, image data of the route such that the image data is superimposed on a position of the route in a real world viewable through a display unit, the route starting from the part of the industrial vehicle or the object related to prediction of the route at the position estimated and ending at the interference position, the display unit being configured to be worn on a head of a person, having transparency, and being capable of displaying the image data, wherein, in the step of displaying image data, when the route interferes with the obstacle, displaying the image data of the route ending at the interference position by cutting the route at the interference position, and displaying with a far side of the interference position blocked.

9. A non-transitory computer readable storage medium storing program causing a computer to execute:

estimating a position of an industrial vehicle;

predicting a route of a part of the industrial vehicle or an object moving together with the industrial vehicle with reference to the position estimated, and calculating an interference position at which an obstacle interferes with the route on the basis of map data containing position information of the obstacle; and displaying image data of the route such that the image data is superimposed on a position of the route in a real world viewable through a display unit, the route starting from the part of the industrial vehicle or the object related to prediction of the route at the position estimated and ending at the interference position, the display unit being configured to be worn on a head of a person, having transparency, and being capable of displaying the image data, wherein, in the step of displaying image data, when the route interferes with the obstacle, displaying the image data of the route ending at the interference position by cutting the route at the interference position, and displaying with a far side of the interference position blocked.

* * * * *